(No Model.)  
6 Sheets—Sheet 1.

H. FARMER.
FILTER PRESS.

No. 560,295.  Patented May 19, 1896.

Witnesses:—
William Sadler
Alan Balch

Inventor.
Harrington Farmer
by
W. Fairburn Hack
Attorney.

(No Model.)  6 Sheets—Sheet 3.

H. FARMER.
FILTER PRESS.

No. 560,295. Patented May 19, 1896.

Witnesses:—
William Sadler
Alan Balch

Inventor.
Harrington Farmer
by
W. Fairburn Hart
Attorney

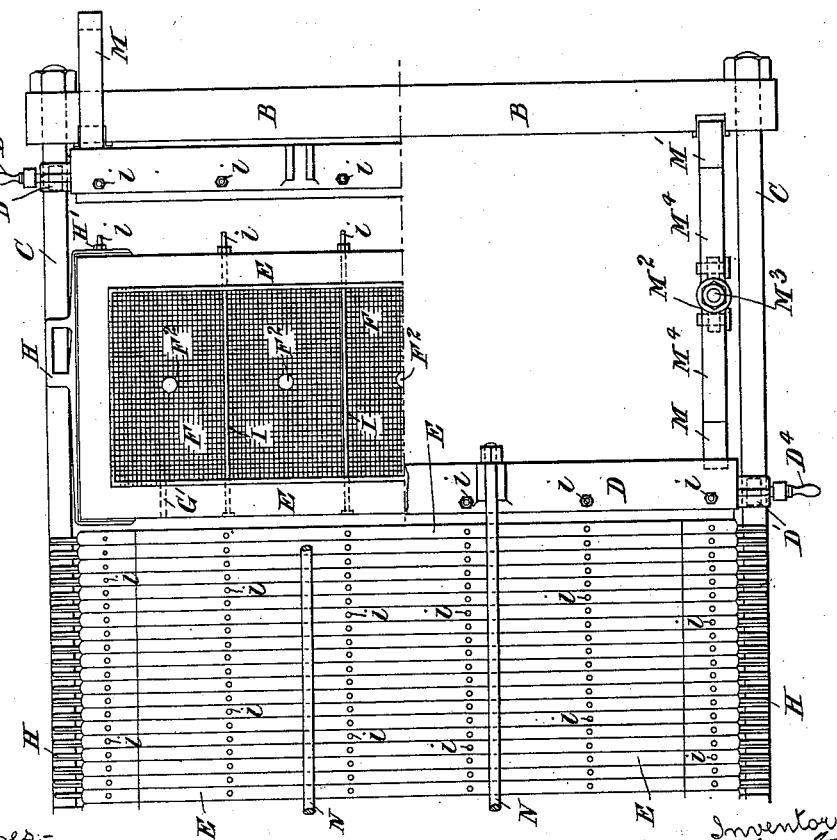

(No Model.) 6 Sheets—Sheet 5.
H. FARMER.
FILTER PRESS.
No. 560,295. Patented May 19, 1896.
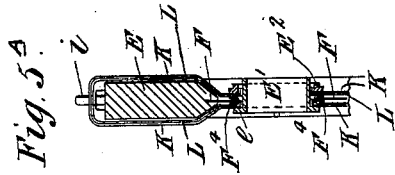
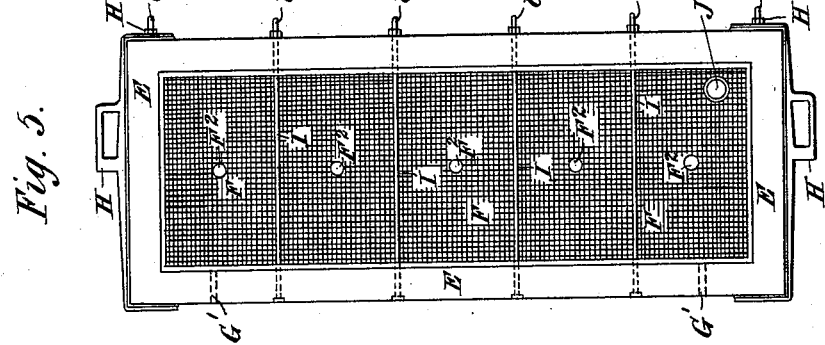
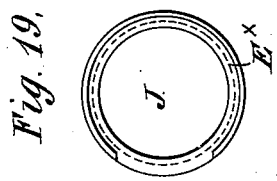
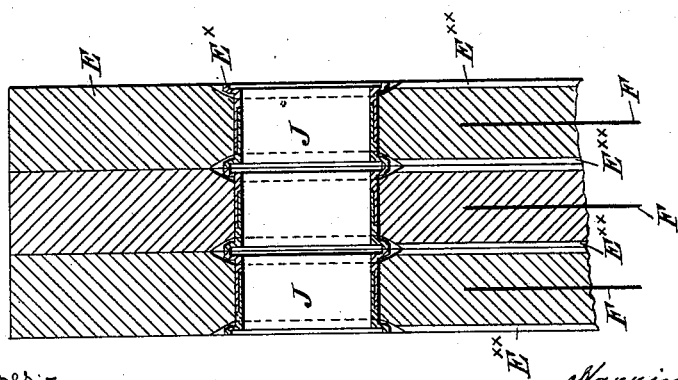
Witnesses:—
William Sadler
Alan Balch
Inventor:—
Harrington Farmer
by W. Fairburn Hoch
Attorney.

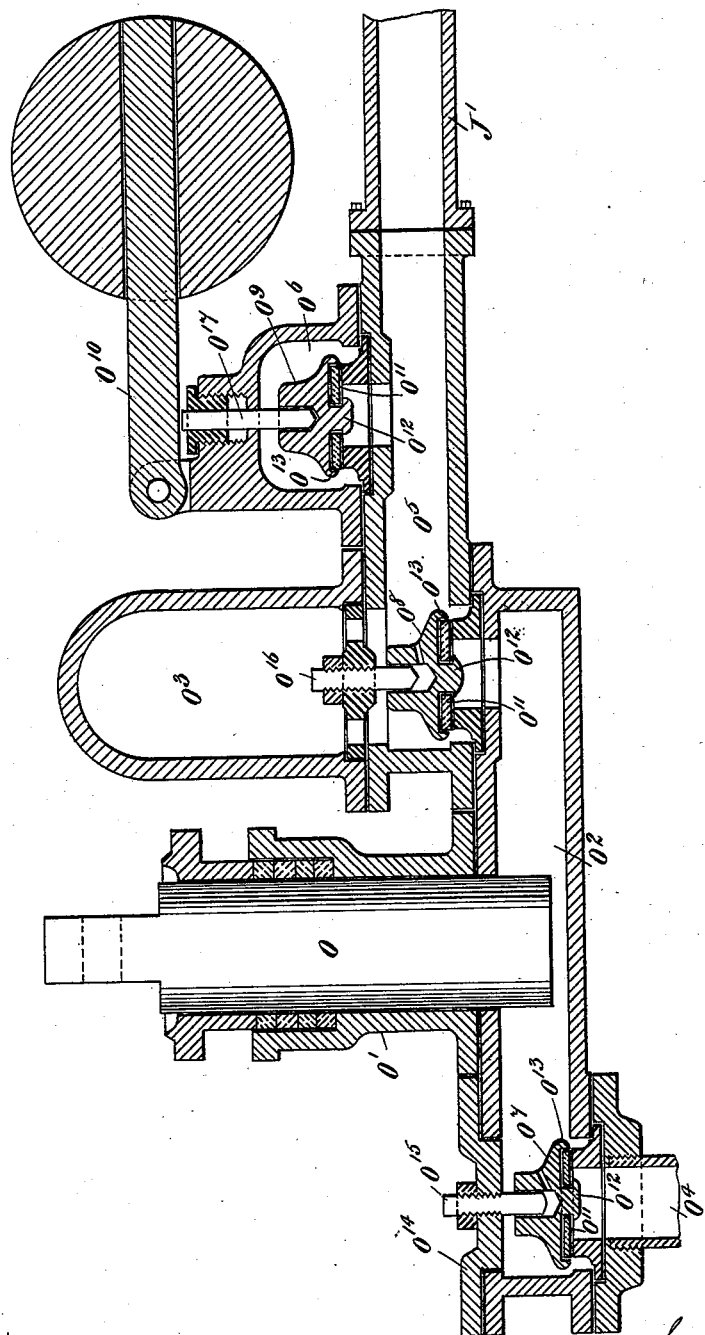

UNITED STATES PATENT OFFICE.

HARRINGTON FARMER, OF CASTLE GRESLEY, NEAR BURTON-ON-TRENT, ENGLAND.

FILTER-PRESS.

SPECIFICATION forming part of Letters Patent No. 560,295, dated May 19, 1896.

Application filed October 8, 1894. Serial No. 525,306. (No model.)

*To all whom it may concern:*

Be it known that I, HARRINGTON FARMER, a subject of the Queen of Great Britain, residing at Castle Gresley, near Burton-on-Trent, in the county of Derby, England, have invented new and useful Improvements in or Relating to Filter-Presses, of which the following is a specification.

This invention relates to improvements in filter-presses—such as are used, for instance, by potters and others—in which the clay having been mixed to, say, the consistency of cream is pumped from its reservoir onto the filter-trays, where the water is allowed to escape, while the clay is allowed to collect or be deposited on the filter-cloths and form what is termed a "cake," weighing from one-half to three-quarters of a hundred weight. The cake is rolled up when it is required to be removed from the tray. Hitherto this class of filter-presses as used in England has been made either of wood or iron with ribbed or corrugated trays (each about three inches thick, and frequently weighs two hundred weight without the cake) to allow the water to pass behind the cloths to outlets, or from the corrugations to outlets. In either case the trays are heavy and cumbersome, and in presses made of wood the operation of fixing the cloths and connecting the tray with the main feed-pipe had to be repeated for each operation, while when iron trays are used they are arranged to let the cake of clay drop out underneath. Now the object of this invention is to obviate these difficulties and to provide a light, yet substantial, perfect equilibrium press, requiring less manual labor in its operation and at the same time producing better, cleaner, and an increased amount of work. I achieve these objects by mechanism illustrated in the accompanying drawings, in which—

Figure 1:
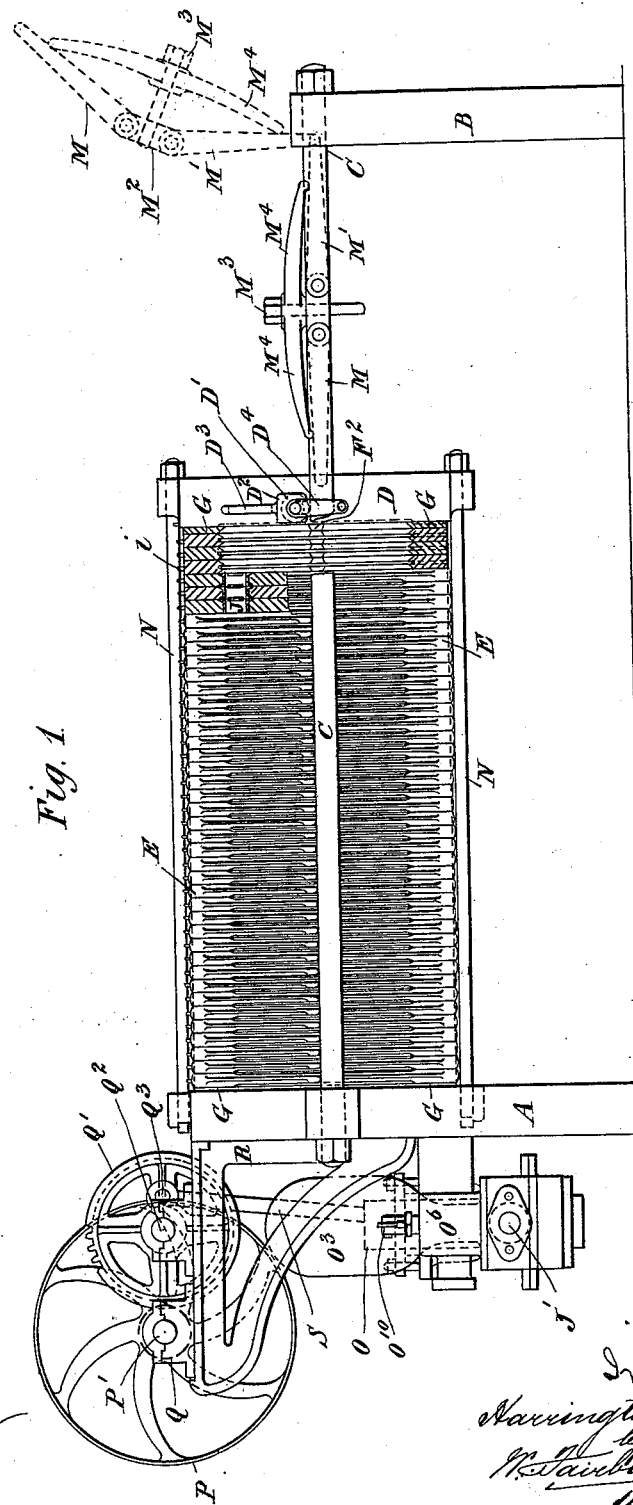
Figure 2:
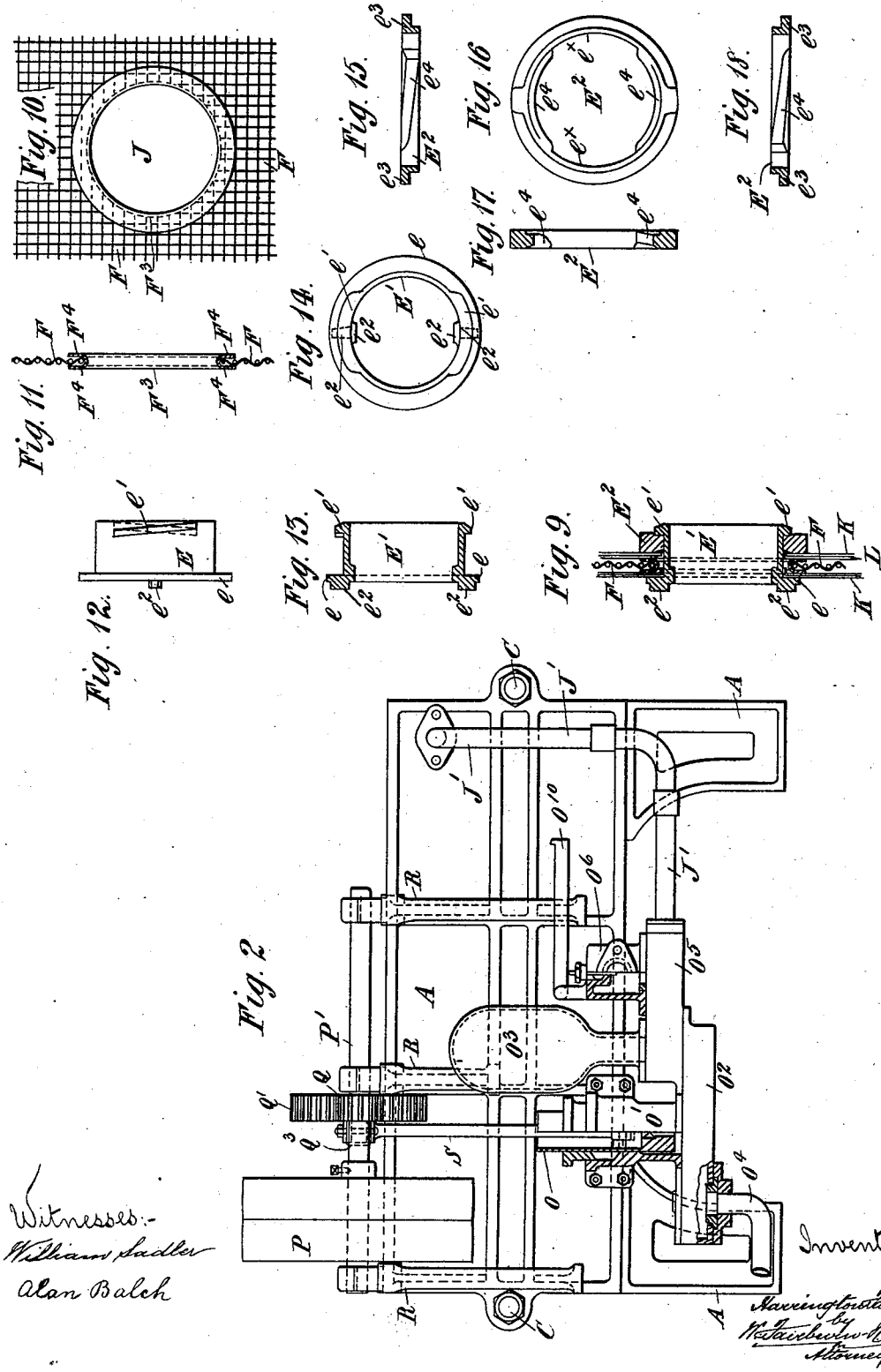
Figure 3:
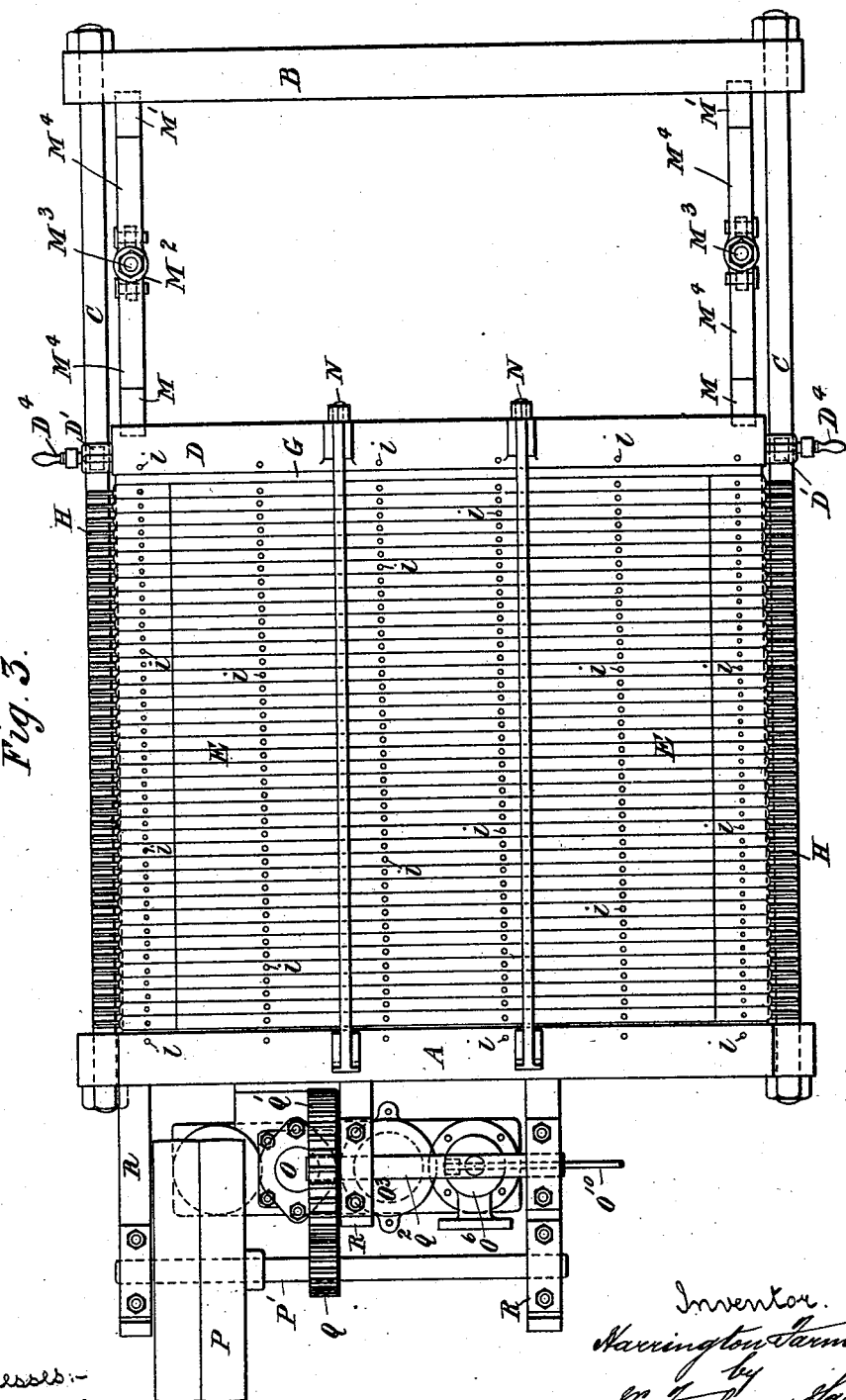

Figure 1 is a part side and part sectional elevation of a filter-press constructed according to this invention; Fig. 2, a part sectional elevation of the pump and part end elevation of the press; Fig. 3, a plan looking at the top; Fig. 4, a part plan showing the press and its filter-trays partly open and partly closed. Figs. 5 and $5^A$ are respectively a plan and sectional elevation of one of the filter-trays with the cloth removed; Fig. 6, a part sectional elevation of the trays, showing the feed-inlet. Figs. 7 and 8 are respectively a part front elevation and a side elevation of the end plate; Fig. 9, a sectional elevation showing the method of forming and securing parts of filtering-trays in position. Figs. 10 and 11 are respectively a part front elevation and a section of a portion of the wire webbing, forming center of the tray and the feed-inlet. Figs. 12 to 19 are elevations and sections of parts of the feed in detail; Fig. 20, a sectional elevation of the feed-pump.

Like parts in all the views are marked with similar letters of reference.

According to this invention the filter-press may be constructed partly of wood, iron, steel, brass, copper, or other suitable metal; and it consists of a stationary head A and a cross-piece B, both of which are made of metal, and they are kept at suitable distances apart by means of any desired number of suitable wrought-iron tension-bars or stretchers C. Two of these stretchers are shown in the drawings.

Between the fixed press-head A and cross-piece B is mounted so as to slide freely on the side tension-bars C a movable head D, also made of metal. The movable head D is arranged to run on rollers D' (see Figs. 7 and 8) on the tension-bars. The rollers are mounted in bearings $D^2$ below the handles $D^3$, capable of being operated by the hand-lever $D^4$, near the inner edge of the head, so that when it is drawn or moved away by the hand-lever $D^4$ from the trays E its top will fall or lean back into an angular position, or the position shown at Fig. 4, for the removal of any cake adhering to its face. After the cake has been removed the movable head D may be run back to the cross-piece B for allowing the trays E to be separated and similarly operated. The said heads may be made of any suitable metal—such as, for instance, cast iron or steel—and the heads A and D are recessed on their inner faces, as at $d$, (see Fig. 8,) to receive a sheet of woven-wire webbing or of perforated metal plate F, of a pliable nature, not liable to break, of any suitable thickness and gage. When wire webbing F is employed, it may be of brass, copper, iron, or steel, plain or galvanized. The said sheets of wire webbing or perforated plates, such as zinc, may or may not be corrugated; but they are preferably corrugated, and they are placed in the recesses $d$ of the heads A and D and retained in position by means of strips G or frames, of wood or other suitable material, being screwed on their outer edges. Distance-pieces $F^2$ are provided on one or both sides—say alternately—of the wire webbing F, and are of such a thickness as to be level with the frame G or E.

Over the face of the wire webbing F is placed one or more layers of canvas and filter-cloth, as will be hereinafter described, for the trays E.

It will be readily understood that practically the woven-wire webbing F, the canvas, and filter-cloth when fixed to the press-heads as described forms about one-half of a tray E. Outlets G' are provided in the strip G for the escape of the water after it has passed through the filtering medium.

Between the movable head D and the fixed head A are inserted any desired number of trays E. Forty-one of these trays are shown in the drawings; but their number may be increased or diminished, as circumstances require.

The trays E are all constructed alike and as follows: They may be constructed of any suitable material—such as, for instance, wood, iron, steel, or other suitable metal or of one or more of these combined; but they are preferably formed of wood in the form of a frame E of or about the same size as the press-heads A and D and provided with a groove $e$ or recess on their inner faces or edges for the reception of a sheet of woven-wire webbing or perforated metal plate F, which may be retained in the groove or recess by any suitable and convenient means. On the wire webbing F is also arranged any desired number of distance-pieces $F^2$, say five for each tray. These distance-pieces are fixed by screws alternately on each side of the webbing F. These distance-pieces are made to be level with the frame E, and when the trays are in position in the press are employed for strengthening the wire webbing and preventing it from bulging. The frames of the trays are securely held together with a metal handle H at each end arranged to form corner-plates on their top and bottom sides, which are firmly secured thereto by any convenient means, such as by bolts H'. The under side of the handles H are arranged to rest upon the upper surface of the tension-rods C, which are in a line with the center of the trays, but nearer to their inner or face edges, so as to facilitate the turning of the trays into a horizontal position (see Fig. 4) whenever it is required to remove the cakes of clay or other material operated upon therefrom. In addition to these handled corner-pieces H the trays E may be provided with any desired number (say, for instance, four) of bolts I, which are passed through the trays from top to bottom for preventing them expanding when internal pressure is applied from the pump. On the top ends of these bolts I and the bolts H' may be formed studs or pins $i$ (see Fig. 5) for retaining the filter-cloths K in position.

The wire webbing F may, for strengthening purposes, be corrugated, say, either vertically or horizontally, (see Fig. 9,) and in any suitable position—say, for instance, in one corner of the wire webbing, as at Fig. 5, or in the framework E, as at Fig. 6—is provided the service-inlet J, arranged as follows: When the service-inlet J is formed in the frame E, as at Fig. 6, that portion of the frame is preferably made wider than the other portions. A hole is made in the frame, into which is inserted the socket $E^X$ made in two portions screwed or otherwise fixed together. The flanges of the socket are preferably arranged to be within the frames and suitable openings communicating with grooves $E^{XX}$ are provided in the frame for the passage of the water and clay onto the filter-cloths; but I prefer to arrange the service-inlet J in the wire webbing itself, as shown at Fig. 5. When so arranged, it is constructed as follows:

A socket E', Figs. 9, 12, and 13, is armed with a flange $e$, and on its periphery are two or more inclined projections $e'$, arranged to form a portion of a wedge or part of a screw-thread. On the face of the flange $e$ are provided, say, two or more distance-pieces $e^2$. On the periphery of the barrel-portion socket is placed the ring or nut $E^2$, (see Figs. 15 to 18,) provided with a flange $e^3$ and armed on its inner periphery with two or more inclined projections $e^4$, arranged to engage or mesh with the projections $e'$ on the socket. The opening J (see Fig. 10) in the wire webbing F is surrounded and strengthened with a metal ring or eyelet $F^3$, (see Figs. 9 to 11,) which incloses the "raw" edges of the wire webbing within its flanges $F^4$. The socket, with the filtering medium, consists of the cloth K and hemp or jute sheet, commonly termed "Harding sheet" L, both of which may be sewed round the orifice through which the socket passes. The filter-cloth K and sheet L are also provided at or about their center transversely with a number of eyeleted holes, through which the pins $i$ pass. The cloth K and sheet L are thrown over the top of the frame E of the tray (see Fig. 5$^A$) with the pins $i$ through their eyeleted holes. The barrel of the socket E' is then threaded through the openings in the two portions of the cloth K and of the sheet L and of the wire webbing F, with the latter between the two layers of the cloth and sheet, as at Fig. 9. The ring $E^2$ is then passed on to the barrel of the socket E', the projections $e'$ passing through the recess $e^X$ of the nut, and it is then partially rotated for bringing the faces of the inclined projections $e'$ $e^4$ in contact with each other and, as it were, screwing the cloth K, sheet L, and wire webbing F together and locking them in position.

The inlet-service J is connected by pipe J' with the feed-pump, consisting of a pump-plunger O, working in the barrel O' and trough forming passage $O^2$, to which the barrel O' is fixed. Communicating with the passage $O^2$ is the inlet supply-pipe $O^4$ and a second trough forming a passage $O^5$, which in turn communicates with the pipe J'. To the top of the trough $O^5$ are fixed the air vessel $O^3$ and the casting forming the relief-valve chamber $O^6$. The openings communicating, respectively, with the inlet supply-pipe $O^4$, the passage $O^5$, and relief-chamber $O^6$ are closed with valves $O^7 O^8 O^9$, the latter of which is retained on its seat by the weighted lever $O^{10}$, jointed to the casting $O^6$. Each of the said valves is provided with an india-rubber diaphragm $O^{11}$, slightly larger than the valve-seat, and which is held in position by the headed pin $O^{12}$, while the edge of the diaphragm is protected by the lip $O^{13}$. On removing, respectively, the cover $O^{14}$ or air vessel $O^3$ or relief-chamber $O^6$ either of the valves $O^7 O^8 O^9$ may be readily examined, and their lift respectively adjusted by the spindles $O^{15} O^{16} O^{17}$.

The pump-barrel O' is bolted to the head A, and a reciprocating motion is imparted to the plunger O from any suitable source of power through driving-pulley P, mounted on shaft P', gear-wheels Q Q', mounted respectively on shafts P' $Q^2$, carried in pedestals on the framework R, fixed to the head A, and connecting rod S, attached at one end to the plunger O, and pin $Q^3$, fixed to the wheel $Q^2$.

The press may be closed up by means of a toggle-lever (consisting of two arms M M', jointed to a fixing $M^2$, attached by a tightening-screw $M^3$ to a stretcher $M^4$) on each side of the press, which may or may not be jointed to the cross-piece B and raised or lowered into position, as at Fig. 1, by hand and then tightened by means of a screw or screws. The toggles and parts connected therewith in dotted lines at Fig. 1 show them raised from their work for opening the press.

For heavy or large presses any desired number of longitudinal bolts N may be employed for making it additionally secure.

The action of the press is as follows: The trays E having been covered with the filter-cloths K and sheets L and the sockets $E^\times$ or E' fixed in position, as described, the trays are then placed in the press between the head A and cross-piece B, as at Fig. 1, with the lower portion of their handles H resting upon the tension-bars C and the frames E, distance-pieces $F^2$, and projections $e^2$ on socket E' in contact with the respective pieces of each tray. The loose head D is then brought up to the trays and secured in position by the toggles M M'. The belt is then thrown onto the driving-pulley P and by means of the shafts, gear-wheels, and connecting-rod the plunger O is caused to reciprocate, when the prepared clay will be drawn through pipe $O^4$ (valve $O^7$ being thereby raised) into passage $O^2$, forced into passage $O^5$ (valve $O^8$ being thereby raised) and along pipe J' in the inlet-service J, and distributed to the trays. The projections e' on the sockets by their contact with the unflanged end of the preceding socket form an opening for the prepared clay to pass to the filter-cloths. The clay in solution is deposited upon the cloth K, while the water will pass through it and escape through the openings G'. When the filtering operation has been sufficiently performed, the pump is stopped, the toggles thrown back, and the loose head D and trays are successively drawn back, tilted onto their sides, as at Fig. 4, and the cake rolled up for removal purposes. Should the pressure during the filtering operation become too great or should it be desired to immediately relieve the pressure, the valve $O^9$ will or may be raised.

The press by the arrangement herein described only takes about half an hour, instead of one and a half to two hours, to empty and connect it after being emptied.

The press also possesses the following advantages, namely:

(a) By the application of woven-wire web F or corrugated or perforated metal of a pliable nature to filter-press the trays are not so liable to break and the whole is placed in equilibrium.

(b) By being able to turn down the trays E on the tension or side rods C the emptying of the press is both easier and quicker than the wooden press and easier and cleaner than the iron press.

(c) By being able to turn back the movable head D for the purpose of removing the cake therefrom the danger of the cake falling is obviated.

(d) The trays are only about one-fourth the weight of those of the same capacity in wood and iron presses; but they are arranged to have ample strength, owing to the principle of construction.

(e) The studs or pegs i fix and retain the cloths K and sheets L in their proper position.

(f) By the application of the toggle-levers for tightening up of filter-presses a great saving of time is effected.

Having now described the nature of my invention, what I claim, and desire to be secured by Letters Patent, is—

1. In a filter-press such as herein described, the combination of the fixed head A having a cross-piece B connected to it by a single tension-bar C arranged on each side thereof in a line with the center of the said head, a movable tilting head D armed with handles $D^3$ in which rollers D' are mounted and arranged near the inner face of the head for traversing it upon the top of said tension-bars, said heads A and D being armed with half-trays fixed to their faces as set forth; trays E constructed as described and provided with outlets G', said trays being interposed between the fixed head A and said movable tilting head D, said trays being supported on said tension-bars C by handles H which also act as pivots upon which the trays are tilted for the removal of the cake, and as strengthening-pieces for the light frame E provided with outlets G' and also grooved to receive the central perforated wire webbing F, and armed with distance-pieces F², the said frame being stayed with bolts I provided with pins $i$ for retaining the eyelets of the filter cloth and sheet in position over the face of the wire webbing as set forth; said trays having the service-inlet J formed in each tray as described all substantially as herein set forth.

2. The combination in a filter-press such as described of the toggles composed of the arms M M' jointed to the screw-block M², and the stretcher M⁴ arranged to rest upon the upper faces of the said arms and connected to the block M² by a screw M³ with the movable and fixed heads of the press, tension-bars, and cross-piece as set forth.

In testimony whereof I have hereunto signed my name to this specification in presence of two subscribing witnesses.

HARRINGTON FARMER.

Witnesses:
FREDERICK FARMER,
HERBERT S. NICHOLSON.